May 7, 1963
M. L. HILL
3,088,706
PLUG VALVE STEM MOUNTING
Filed June 14, 1961
3 Sheets-Sheet 1
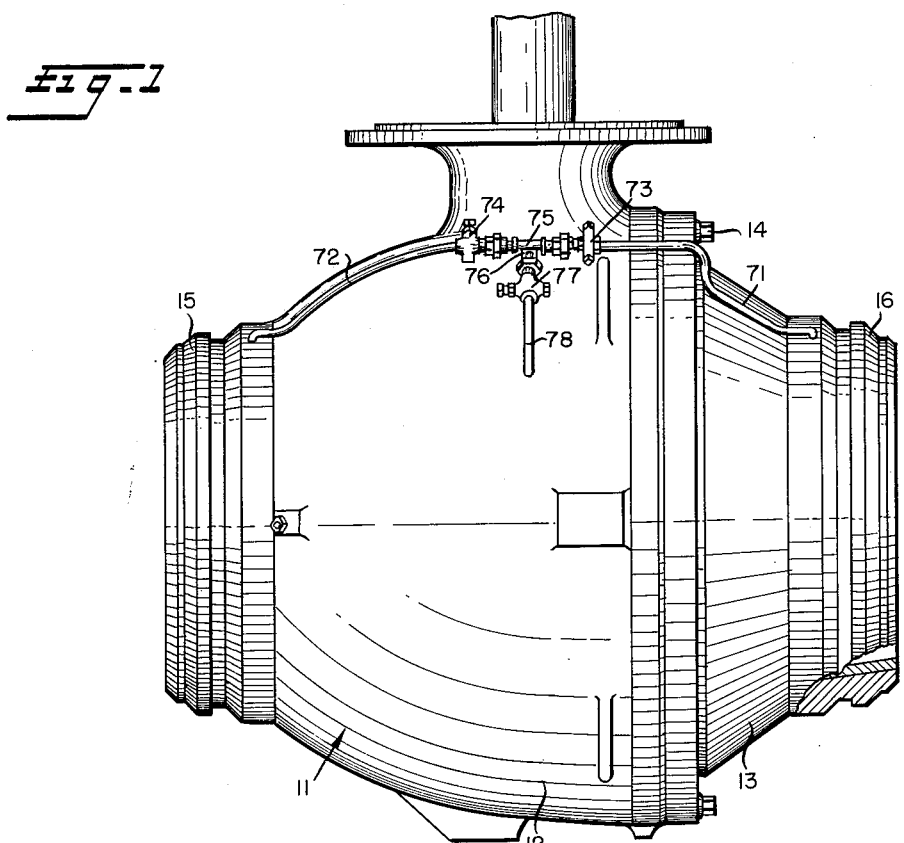
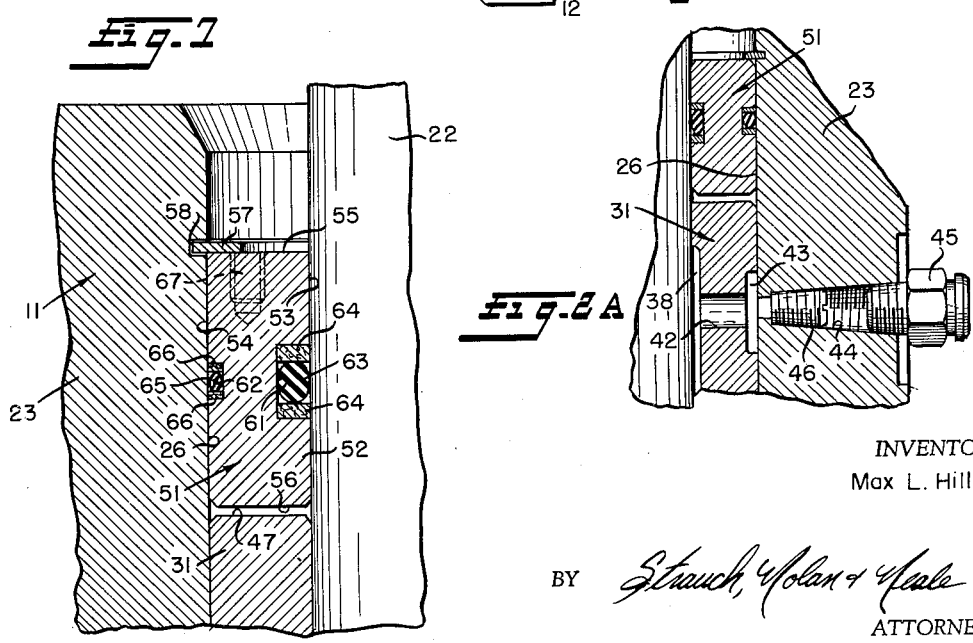
INVENTOR
Max L. Hill
BY *Strauch, Nolan & Neale*
ATTORNEYS

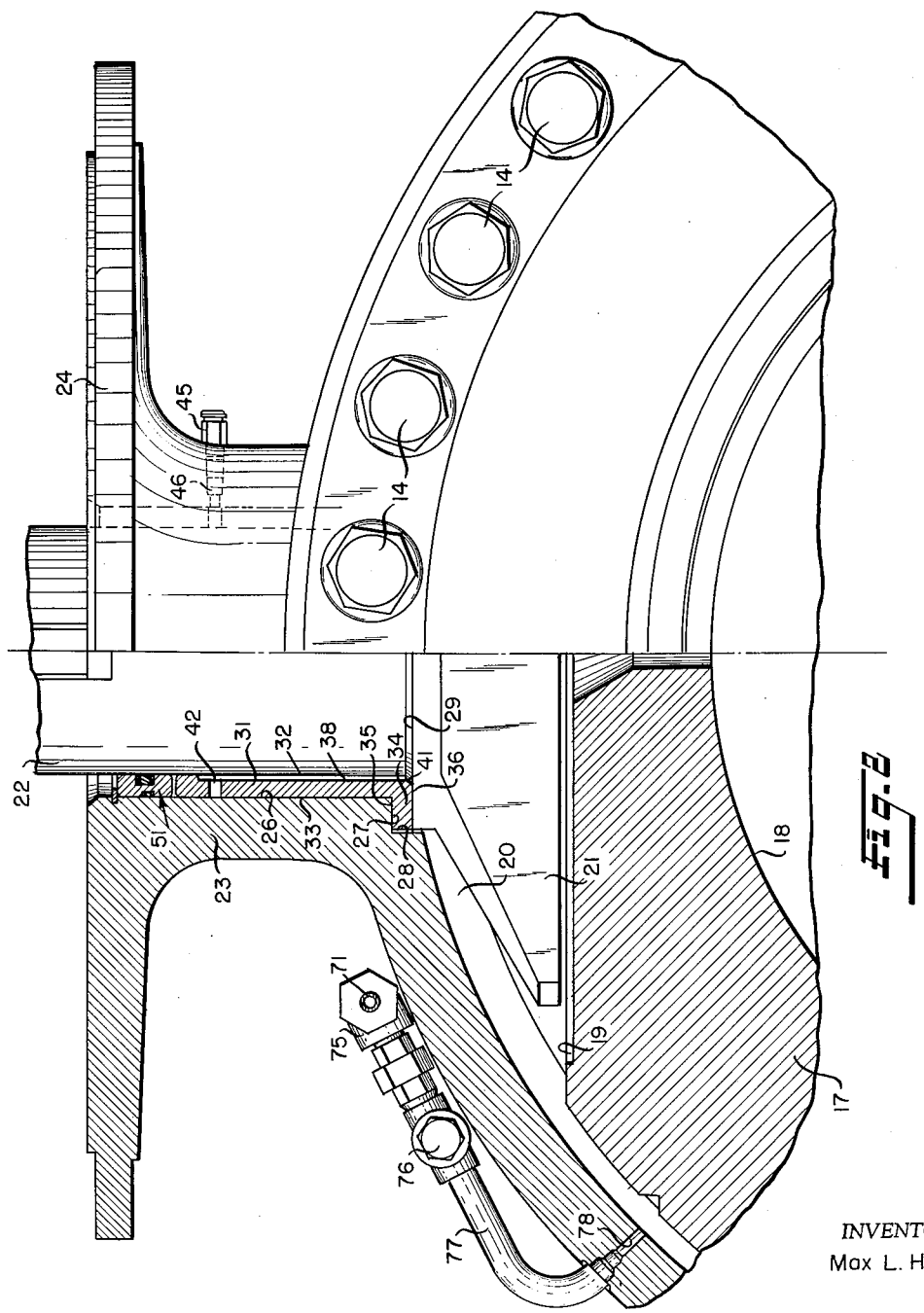

May 7, 1963   M. L. HILL   3,088,706
PLUG VALVE STEM MOUNTING
Filed June 14, 1961   3 Sheets-Sheet 3
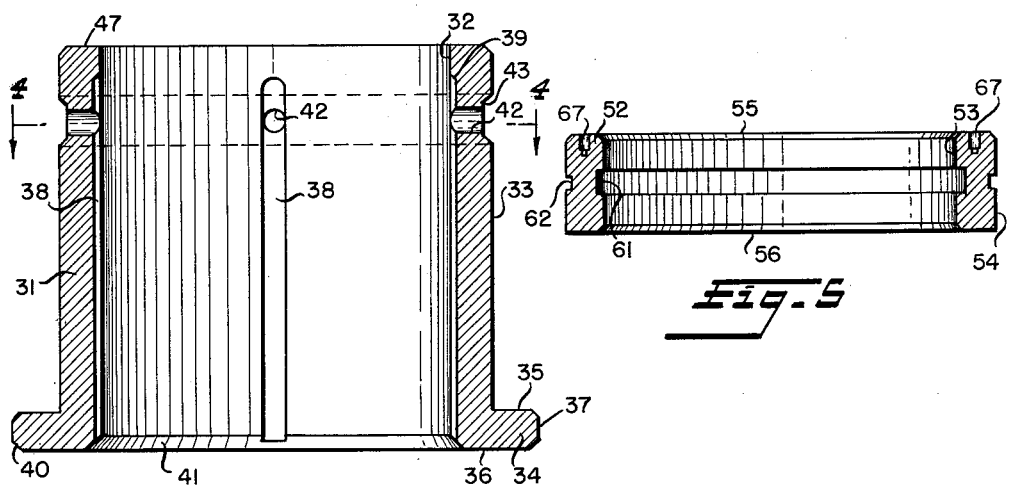
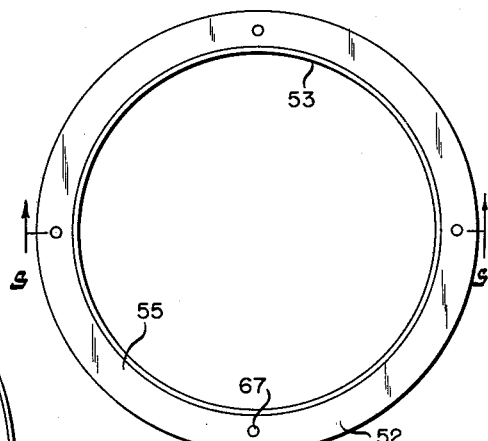
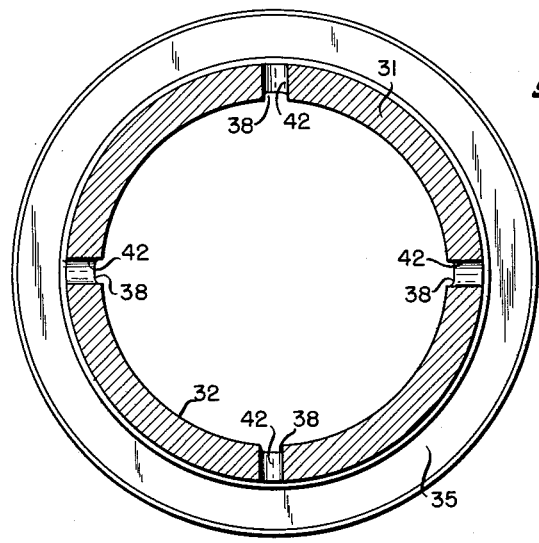
INVENTOR
Max L. Hill
BY
ATTORNEYS United States Patent Office 3,088,706
Patented May 7, 1963

3,088,706
PLUG VALVE STEM MOUNTING
Max L. Hill, Atchison County, Kans., assignor to Rockwell Manufacturing Company, Pittsburgh, Pa., a corporation of Pennsylvania
Filed June 14, 1961, Ser. No. 117,041
11 Claims. (Cl. 251—214)

This invention relates to plug valves and particularly to special valve stem mounting sealing arrangements.

In its preferred embodiment the invention will be described as applied to the stem of a ball valve, but the essential features thereof are applicable to any plug valve having a rotary operating stem.

The invention has particular application in the field of high pressure pipeline control valves in that it remedies a situation long recognized as undesirable and not satisfied by hitherto used conventional stem packings. Some of these valves are used in pipelines of thirty-six inches or more in diameter containing gas at pressures exceeding a thousand pounds per square inch, so that prevention of leakage is essential for both economic and safety reasons.

It is therefore the primary object of this invention to provide a novel plug valve stem seal arrangement.

A further object of the invention is to provide a novel plug valve stem mounting and seal arrangement wherein the stem is journaled in a lubricated bushing inserted into a valve body bore from the interior of the valve body, and cooperating axially engaging valve seat faces are provided on the stem and bushing.

It is a further object of the invention to provide in a plug valve assembly wherein the valve stem is mounted for rotation and at least slight axial displacement, coacting axially engageable valve seat faces on the body and stem and means for introducing lubricant into the space between said faces.

A further object of the invention is to provide means for journalling and sealing around a rotatable plug valve stem that extends through a valve body bore wherein a fixed lubricating bushing is inserted into the bore from the interior of the bore and a removable seal assembly is introduced through the outer end of the bore and held against outward displacement.

Further objects of the invention will appear as the description proceeds in connection with the appended claims and the annexed drawings wherein:

FIGURE 1 is a side elevation of a ball valve incorporating a preferred embodiment of the invention;

FIGURE 2 is an enlarged fragmentary view partly in section showing the valve stem seal in position;

FIGURE 2A is an enlarged fragmentary view partly in section showing how the lubricant is introduced into the bushing;

FIGURE 3 is a section through the stem bushing;

FIGURE 4 is a section on line 4—4 of FIGURE 3;

FIGURE 5 is a section through the stem seal ring;

FIGURE 6 is a plane view of the seal ring of FIGURE 5; and

FIGURE 7 is an enlarged fragmentary sectional view showing the seal ring assembly details.

The valve of FIGURE 1 comprises a body 11 that consists essentially of a plug mounting housing 12 and an end closure 13 secured over the open side of the housing as by bolts 14. The body is open at opposite ends and formed at those ends with annular pipeline attachment formations 15 and 16.

Internally a ported ball 17 (FIGURE 2) is supported on spherical seat rings (not shown) for 90° rotation between a valve closed position wherein it blocks flow of fluid through the valve and a valve open position wherein port 18 through the ball is aligned with and becomes part of the fluid passageway through the valve.

This internal construction is preferably the same as that disclosed in United States Letters Patent No. 2,788,015 to Scherer, dated April 9, 1957, to which reference is made for any detail needed to understand the structure.

The upper part of ball 17 is slotted at 19 to receive the tang 21 rigid with the lower end of a cylindrical valve stem 22 which projects from the interior of the valve body through a hollow integral boss 23 that terminates at its upper end in a wide flange 24. A suitable operator assembly (not shown) is adapted to be mounted on flange 24 containing a drive mechanism including a drive member keyed to the stem at 25 and adapted to rotate the stem about its vertical axis.

The bore 26 of boss 23 is cylindrical and is coaxially spaced from the cylindrical periphery of stem 22. At the lower end of bore 26 the housing wall is internally shouldered to provide an annular flat face 27 normal to the bore axis and a cylindrical wall 28 of larger diameter than the bore.

Adjacent the lower end of the bore the stem 22 is formed with a flat annular face 29 normal to the stem axis and having an outer diameter about equal to that of wall 28. This is preferably at the juncture of the tang with the stem 22.

Within the annular space between bore 26 and stem 22 is press fitted an annular bushing 31 having cylindrical inner and outer walls 32 and 33 in tight smooth contact with the stem and bore respectively. This bushing is preferably of cast iron with machined peripheries, and it is shown enlarged in FIGURES 3 and 4.

At its lower end bushing 31 is formed with an integral radial flange 34 that extends outwardly at right angles and has parallel flat annular machined faces 35 and 36 normal to the bushing axis and a cylindrical periphery 37 of such diameter as to have at least a clearance fit with bore wall 28. Face 35 tightly and smoothly engages housing face 27.

Interiorly bushing 31 is formed with a series of cast longitudinal grooves 38 that are equally spaced circumferentially and extend from a region 39 near the upper end of the bushing where the groove ends are closed to the lower end of the bushing where the groove ends are open, a chamfer 41 being cut around the lower edge of wall here to insure such opening. Grooves 38 need not be machined. A chamfer 40 is preferably machined around the lower edge of periphery 37.

Near the upper end of the bushing and just below the closed ends of the grooves 38, a radial port 42 is provided through the bushing wall into each groove, the outer end of each port 42 opening into a continuous annular recess 43 in the outer bushing wall 33.

A radial passage 44, see FIGURE 2A, is formed through the wall of housing boss 23 and opens at its inner end into the space between bore 26 and stem 22 directly at bushing recess 43. As shown in FIGURE 2A, the axial dimension of recess 43 is made sufficiently long to insure that passage 44 opens into recess 43.

Threaded within the outer end of passage 44 is a fitting 45 for the introduction of a sealing plastic lubricant compound under pressure. This fitting may be a conventional Alemite type fitting adapted to be coupled to a grease gun for pressurized lubrication.

Within passage 44 is a suitable check valve 46 preferably of the spring biased ball type that opens to admit the flow of plastic material to recess 43 but blocks against return flow toward fitting 45.

At its upper end bushing 31 has a flat annular face 47 normal to the bushing axis.

In the space between bore 26 and stem 22 above bushing 31, there is disposed a seal ring assembly 51 that comprises a rigid metal ring 52 having an inner cylindrical periphery 53 in sliding fit with stem 22 and its outer cylindrical periphery 54 in sliding fit with bore 26. Ring 52 has flat upper and lower end faces 55 and 56 normal to its axis.

Lower end face 56 is adjacent the upper end face 47 of the bushing 31, and the upper end face 55 abuts a snap ring 57 having its outer periphery disposed in an annular recess 58 in bore 26. Snap ring 57 is of any circumferentially resilient conventional type adapted to expand into solid fit in recess 58, and it serves as a stop against upward displacement of ring 52 but is readily removable when the ring 52 is to be extracted as for repairing the seal.

Ring 52 is formed about midway of its length with an internal continuous recess 61 and a smaller external continuous recess 62. A resilient, normally circular cross-section, rubber O-ring 63 is disposed in recess 61 which is of such rectangular configuration and dimensions that O-ring 63 is compressed radially between the stem 22 and the bottom of recess 61, assuming the symmetrical oval shape of FIGURE 7, but is substantially unrestrained against expansion longitudinally of the stem. The space in recess 61 above and below the compressed O-ring 63 is occupied by similar annular back-up rings 64 of some flexible material like leather having their inner peripheries in wiping fit with stem 22.

Similarly a smaller normally circular cross-section rubber O-ring 65 is disposed in recess 62 radially compressed between the bottom of recess 62 and bore 26 but axially unconfined, and flexible leather or like back-up rings 66 are disposed above and below O-ring 65.

In assembly as shown in FIGURE 7 for example, the O-rings 63 and 65 seal against the escape of fluid under pressure axially outwardly of the stem and bore.

Ring 52 has a plurality of threaded bores 67 opening to its upper face, for attachment of a suitable pulling tool to remove the seal assembly after snap ring 57 is taken out.

In the assembled valve, bushing 31 is axially fixed and the stem 22 depends from the operating mechanism, being capable of slight free axial displacement, and tang 21 is within the ball slot 19 so that rotation of stem 22 will rotate the plug 17. When there is no pressure in housing space 20 around the plug stem surface 29 seats lightly, or not at all, against bushing face 36. For example, the stem 22 may be mounted similarly to the stem of the plug disclosed in Volpin Patent No. 2,647,720.

FIGURES 1 and 2 show an arrangement for introducing line pressure into the space 20 around the plug 31. As shown in FIGURE 1 pressure from the pipeline from either side of the plug within the housing may be obtained through side conduits 71 and 72. These conduits are connected through suitable manual valves 73 and 74 respectively to a T-fitting 75 having a leg 76 connected through valve 77 and center conduit 78 to the space 20. FIGURE 2 shows conduit 77 coupled to a suitable port 78 in the housing. Conduits 71 and 72 are similarly connected into the body axially outwardly of the seat rings supporting plug 17.

Assuming that the upstream side of the valve is at 16, the space 20 may be provided with upstream line pressure by opening valve 73 and closing valve 74, valve 77 being usually open. If the flow is in the other direction, the valve 74 is opened and valve 73 is closed. This provides an effective selective pressure bypass around the seat rings.

Pressure in space 20 acts upwardly against the lower end of stem 22 to displace the stem upward axially in bore 26, and as a result bushing face 36 is contacted tightly against stem face 29.

A suitable flowable plastic sealing and lubricant material, such as one of the usual plug valve lubricants, is introduced during assembly through passage 44. This material distributes itself annularly all around to fill recess 43 and flows through ports 42 to fill grooves 38. Rotation of stem 22 will distribute lubricant from the grooves 38 circumferentially all around bore 26 so that adequate lubricated rotation of stem 22 is provided and a film of this lubricant material exists all along the small space between bushing periphery 32 and stem 22.

The invention thus provides an effective seal between the plug valve stem and body which is augmented by line fluid pressure, and which enables the seal assembly thereabove to be removed and replaced even while the valve body contains fluid at line pressure, which is a distinct advantage in handling high pressures and/or corrosive fluids.

In the stem arrangement the line pressure urges faces 36 and 29 together with a valving action. The interface at 29, 36 is moreover coated with a film of lubricant from grooves 38 distributed through the annular passage provided around the stem by chamfer 41, so that while they seal against escape of fluid pressure these surfaces 29, 36 are lubricated for relative rotation to enable easy turning of the valve stem 22.

The face fit of the bushing in bore 26 and the annulus of lubricant around the bushing bore interface at 43 insure further against pressure leakage between the bushing and bore 26.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent in the United States is:

1. In a plug valve assembly, a body having a ported plug rotatably mounted therein and pipeline connection passages at opposite sides of the plug, a rotatable valve stem extending from operative connection with said plug through a body opening to a point outside the body for connection to an operator, and means mounting and sealing said stem within said opening comprising a bushing extending within said opening from the interior of said body, means for introducing lubricant between said bushing and said stem, and a radial seal assembly in the opening disposed axially outwardly of said bushing, said seal assembly being inserted through said opening from exteriorly of said body and comprising inner and outer radially compressed seal rings.

2. In the assembly defined in claim 1, said bushing being tight in said opening and having a series of longitudinal grooves open to the stem, and radial ports connecting the grooves to an annular recess on the bushing open to a wall of said opening, and said lubricant introduction means comprising a check valved passage to said recess.

3. In the assembly defined in claim 1, said seal assembly being a cartridge having an annular rigid body formed with inner and outer annular recesses containing said seal rings, and a removable stop being provided in said opening for axial abutment with said cartridge body to arrest axial outward displacement of said seal assembly.

4. In a plug valve assembly, a valve body having a ported plug rotatably mounted therein and pipeline connection passages at opposite sides of the plug, said body having a bore through a wall thereof, a valve stem extending through said bore, said valve stem having a detachable motion transmitting connection with said plug such that rotation of the stem rotates the plug and said connection permitting slight axial displacement of said stem, a bushing rigidly mounted in said bore in surrounding relation to the stem, means providing axially facing smooth engaging surfaces on said stem and the inner end of said bushing so that outward displacement of said stem in response to fluid pressure within the body will urge said surfaces tightly together, means for introducing lubricant between the bushing and said stem, and a radially compressed seal assembly in said bore axially outwardly of said bushing.

5. In the assembly defined in claim 4, means for introducing pipeline pressure from at least one of said passages into the space within said body surrounding said plug and the inner end of said stem.

6. In the assembly defined in claim 4, means for selectively introducing line pressure from one or the other of said passages into the space within said body surrounding said plug and the inner end of said stem.

7. In the assembly defined in claim 4, said bushing having on its inner end a radial flange extending outwardly of said bore and on which flange is formed said smooth seating surface of the bushing.

8. In the assembly defined in claim 7, said bushing being press fitted into said bore from the interior of the valve body and said flange abutting the valve body for determining the axial position of the bushing in the bore.

9. In the plug valve assembly defined in claim 4, said seal assembly comprising an annular seal unit that is slidably inserted through the outer end of said bore around the stem and held against outward axial displacement by removable stop means in said bore.

10. In the plug valve assembly defined in claim 4, said bushing being internally formed to conduct lubricant from the annular space around said stem into the interface between said smooth surfaces.

11. A valve stem bushing consisting of a rigid annular integral member provided at one end only with a radially outwardly projecting flange formed with a continuous smooth axially facing seating surface, a plurality of longitudinal internal grooves in said member open at one end adjacent said flange but terminating adjacent the other end of the bushing so as to be closed, radial ports through the bushing entering said grooves near their closed ends, and a continuous external annular recess on the bushing connecting the outer ends of said ports, said one bushing end being internally chamfered along the inner periphery of said flange surface.

References Cited in the file of this patent

UNITED STATES PATENTS

| | | |
|---|---|---|
| 2,635,903 | Hansen | Apr. 21, 1953 |
| 2,696,363 | Monson | Dec. 7, 1954 |
| 2,963,262 | Shafer | Dec. 6, 1960 |